Patented Feb. 8, 1938

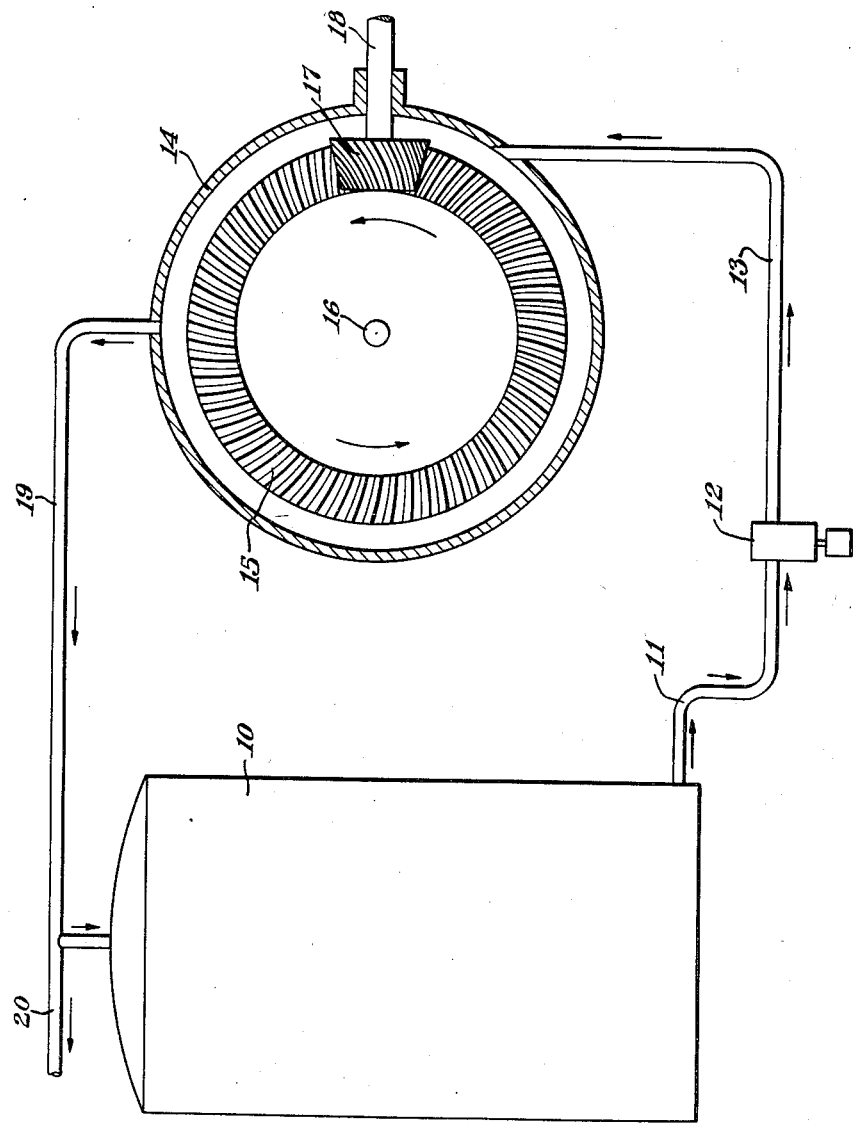

2,108,016

UNITED STATES PATENT OFFICE 2,108,016

GREASE MANUFACTURE

Gus Kaufman, Beacon, N. Y., assignor to The Texas Company, New York, N. Y., a corporation of Delaware Application May 31, 1935, Serial No. 24,241

5 Claims. (Cl. 87—9)

This invention relates to the manufacture of grease, and more particularly to the working down of grease to a desired consistency prior to use thereof.

It is an object of the present invention to provide a simple and effective method of thinning down the grease by mechanical working of a character which is highly effective to work down the grease to an ultimate consistency and to substantially completely eliminate lumpiness.

It has heretofore been proposed to work down grease in a milling machine of the character of a Burr stone mill. While this treatment will thin down the grease and reduce lumpiness, it has been found that it is difficult, if not impossible, to reduce the grease by this method to an ultimate consistency at which substantially no further thinning down will occur during subsequent use. It is also difficult to satisfactorily free the grease from the presence of soap lumps by this method.

I have discovered that if the grease is subjected to a mechanical working down by means of intermeshing positively driven gears which act to draw the grease into the mesh and squeeze it therethrough, the grease thins down very rapidly to such an ultimate consistency as defined above, and moreover, the grease is substantially completely freed from lumpiness. Very satisfactory results may be secured with intermeshing hypoid gearing, spiral bevel gearing or underslung worm gearing. The grease may be heated to a point at which it is sufficiently fluid for pumping, and then passed through the gearing. If desired, the grease may be recirculated through the gearing until a desired increase in A. S. T. M. penetration or decrease in viscosity is attained. Again, the grease may be confined in a housing containing the intermeshing gears, and treated therein until the desired ultimate or equilibrium consistency is attained. This has the advantage of insuring better performance, since the lubricant as sold has approximately the same consistency or penetration as when it is in actual use after a period of running or operation.

Referring to the drawing, which illustrates diagrammatically a preferred embodiment of apparatus for practicing the method of this invention, the grease to be treated is confined within the steam jacketed vat 10. This grease may be maintained cold, or warmed if necessary to a sufficiently fluid condition for pumping. The grease is withdrawn from vat 10 through line 11 by pump 12, and delivered through line 13 to the interior of housing 14 confining the gearing.

In the specific embodiment disclosed herein, a hypoid gearing of the character of that employed in automobile differentials is illustrated diagrammatically. A rear axle gearing as used on Model 1934 Hupmobile "6" gave satisfactory results. No attempt is made to illustrate the complete construction of the axle and housing in the drawing, but only a diagrammatic showing of a portion of the gearing is included. This comprises a ring gear 15 mounted on shaft 16 which is positively driven by a suitable source of power (not shown). Meshing with ring gear 15 is a pinion gear 17 carried by the stub shaft 18. The grease is preferably delivered to housing 14 at the lower portion thereof. The positively driven gears serve to draw the grease into the mesh and squeeze it therethrough, thereby providing an exceedingly effective thinning down of the grease, with elimination of lumpiness. The treated grease is discharged adjacent the upper portion of housing 14 through line 19, which may return it to vat 10 for recirculation, or discharge it by branch line 20 to a place of storage for finished product.

As a specific example, a soda base grease of the type adapted for automotive lubrication, and having the following approximate composition:

| | Percent |
|---|---|
| Cylinder stock (S. U. Vis. 185–195/210° F.) | 95.5 |
| Sodium soap of hard tallow | 4.0 |
| Water | 0.5 | was acted upon by the above mentioned hypoid gearing, having a ring gear 10" in diameter with a pinion gear 3" in diameter and rotating at 3000 R. P. M. The original consistency of the grease was represented by A. S. T. M. penetration of 400 or S. U. Vis. of 2200 at 210° F. When worked down in the gear machine, the resultant consistency was 200 at 210° F., S. U.

As a further example, a soda base grease of the type adapted for automotive lubrication and having the following approximate composition:

| | Percent |
|---|---|
| Cylinder stock (S. U. Vis. 160/210° F.) | 85.5 |
| Soda soap of hard tallow | 13.5 |
| Water | 1.0 | was acted upon by the above mentioned hypoid gearing. The original consistency of the grease was represented by the A. S. T. M. penetration of 212. When worked down in the gear machine, the resulting consistency was 267.

A soda base grease having the following approximate composition:

| | Percent |
|---|---|
| Cylinder stock (S. U. Vis. 167/210° F.) | 83.0 |
| Soda soap | 16.0 |
| Water | 1.0 | was worked in a spiral gearing of the type of the Ford Model A transmission. The A. S. T. M. penetration increased from 172 to 301.

The particular grease set forth in the first example above is of such a fluid character that the consistency is more conveniently determined and expressed by S. U. viscosity at 210° F. However, in the case of greases of a more plastic consistency, such as those of the second and third examples above, this property is preferably determined and expressed by A. S. T. M. penetration. Wherever the expression "increase in A. S. T. M. penetration" is used throughout the description and claims, it is to be understood that this also comprehends a decrease in S. U. viscosity where the consistency may be more readily determined and expressed in that way.

Wherever the expression "ultimate consistency" or "equilibrium consistency" is employed throughout the description and claims, this means a consistency at which substantially no further increase in A. S. T. M. penetration or decrease in S. U. viscosity will occur during subsequent normal use as a result of the inherent working down properties of the grease.

Obviously many modifications and variations of the invention, as hereinbefore set forth, may be made without departing from the spirit and scope thereof, and therefore only such limitations should be imposed as are indicated in the appended claims.

I claim:

1. The method in the manufacture of a soda base grease, which comprises after saponifying the fatty material and mixing with mineral oil, passing the mixed and saponified grease from a container to a working-down zone and subjecting the grease in said zone to the action of intermeshing positively driven gears which draw the grease into the mesh and squeeze it therethrough, thereby removing lumpiness and working down the grease to an ultimate consistency, at which substantially no further thinning down will occur during subsequent use, and then passing the worked-down grease to a container for packaging without further treatment for use.

2. The method in the manufacture of a soda base grease, which comprises after saponifying the fatty material and mixing with mineral oil, heating the grease until fluid, pumping the fluid grease through intermeshing positively driven gears which draw the grease into the mesh and squeeze it therethrough, thereby removing lumpiness and working down the grease to an ultimate consistency, at which substantially no further thinning down will occur during subsequent use, and then passing the resultant grease to a container for recirculation through the gearing and to a zone of collection for packaging.

3. The method, as defined in claim 1, in which the grease is subjected to the action of intermeshing hypoid gears.

4. The method, as defined in claim 1, in which the grease is subjected to the action of intermeshing spiral bevel gears.

5. The method, as defined in claim 1, in which the grease is subjected to the action of intermeshing gears of the underslung worm type.

GUS KAUFMAN.